US006263282B1

(12) United States Patent
Vallancourt

(10) Patent No.: US 6,263,282 B1
(45) Date of Patent: Jul. 17, 2001

(54) SYSTEM AND METHOD FOR WARNING OF DANGEROUS DRIVING CONDITIONS

(75) Inventor: David Gerard Vallancourt, Middletown, NJ (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/140,563

(22) Filed: Aug. 27, 1998

(51) Int. Cl.[7] .................................................. G06G 7/78
(52) U.S. Cl. ........................ 701/301; 701/96; 342/90; 340/901; 340/425.5
(58) Field of Search .................. 701/301, 96; 340/425.5, 340/438, 463, 901, 902, 903, 904; 342/455; 395/90

(56) References Cited

U.S. PATENT DOCUMENTS

| | | |
|---|---|---|
| 4,012,736 | 3/1977 | Angwin . |
| 4,647,901 | 3/1987 | Teshima et al. . |
| 4,840,436 | 6/1989 | Burgdorf et al. . |
| 4,916,953 | 4/1990 | Lie . |
| 4,924,396 | 5/1990 | Fujioka et al. . |
| 4,948,246 | 8/1990 | Shigematsu . |
| 5,001,641 | 3/1991 | Makino . |
| 5,014,200 | * 5/1991 | Chundrlik et al. .................. 701/96 |
| 5,018,595 | 5/1991 | Hara et al. . |
| 5,053,979 | * 10/1991 | Etoh ................................ 364/528.39 |
| 5,091,726 | * 2/1992 | Shyu ..................................... 340/904 |
| 5,124,923 | * 6/1992 | Takahashi ............................. 701/96 |
| 5,148,484 | 9/1992 | Kane et al. . |
| 5,161,632 | * 11/1992 | Asayama ............................. 180/167 |
| 5,165,497 | * 11/1992 | Chi ...................................... 180/169 |
| 5,189,619 | * 2/1993 | Adachi et al. ........................ 701/96 |
| 5,197,562 | * 3/1993 | Kakinami et al. .................. 180/169 |
| 5,241,478 | 8/1993 | Inoue et al. . |
| 5,278,764 | * 1/1994 | Iizuka et al. ........................ 701/301 |
| 5,307,060 | * 4/1994 | Prevulsky et al. .................. 340/902 |

(List continued on next page.)

Primary Examiner—William A. Cuchlinski, Jr.
Assistant Examiner—Olga Hernandez
(74) Attorney, Agent, or Firm—Brown Raysman Millstein Felder & Steiner LLP

(57) ABSTRACT

A dangerous driving conditions warning system for a vehicle such as an automobile is described. The warning system captures signals from two or more devices in an automobile, such as speedometer, distance measuring device, and airbag, and conveys the signals to a decision circuit which determines whether a dangerous driving condition exists and outputs an activation signal upon detecting a dangerous condition. The activation signal is sent to and activates an indicator such as a warning light or loud audible warning. The warning indicator alerts a trailing vehicle and other vehicles near the vehicle equipped with the warning system of the existence of one of various conditions warranting caution, a reduction in speed, or a veering or turn.

44 Claims, 3 Drawing Sheets

U.S. PATENT DOCUMENTS

| | | | |
|---|---|---|---|
| 5,357,438 | * 10/1994 | Davidian | 701/301 |
| 5,369,590 | * 11/1994 | Karasudani | 701/300 |
| 5,394,326 | 2/1995 | Liu . | |
| 5,396,426 | * 3/1995 | Hibino et al. | 701/96 |
| 5,420,792 | * 5/1995 | Butsuen et al. | 701/96 |
| 5,431,488 | 7/1995 | DeVore . | |
| 5,459,449 | 10/1995 | Ravas, Jr. et al. . | |
| 5,495,243 | * 2/1996 | McKenna | 340/902 |
| 5,502,432 | * 3/1996 | Ohmamyuda et al. | 340/436 |
| 5,510,990 | * 4/1996 | Hibino et al. | 701/96 |
| 5,522,652 | 6/1996 | Negrin et al. . | |
| 5,529,139 | * 6/1996 | Kurahashi et al. | 180/169 |
| 5,572,449 | * 11/1996 | Tang et al. . | |
| 5,593,217 | 1/1997 | Schmitt et al. . | |
| 5,594,645 | * 1/1997 | Nishimura et al. | 701/96 |
| 5,633,705 | 5/1997 | Asayama . | |
| 5,659,290 | 8/1997 | Haeri . | |
| 5,675,518 | * 10/1997 | Kuroda et al. | 702/97 |
| 5,684,702 | 11/1997 | Phillips et al. . | |
| 5,695,020 | * 12/1997 | Nishimura | 180/169 |
| 5,699,040 | * 12/1997 | Matsuda | 340/435 |
| 5,718,451 | 2/1998 | White . | |
| 5,757,308 | 5/1998 | Lissel et al. . | |
| 5,781,119 | * 7/1998 | Yamashita et al. | 340/903 |
| 5,786,752 | 7/1998 | Bucalo et al. . | |
| 5,787,377 | 7/1998 | Watanabe et al. . | |
| 5,805,103 | * 9/1998 | Doi et al. | 342/70 |
| 5,904,215 | * 5/1999 | Ikeda | 180/169 |
| 5,936,549 | * 8/1999 | Tsuchiya | 340/903 |
| 5,938,714 | * 8/1999 | Satonaka | 701/96 |
| 5,978,737 | * 11/1999 | Pawlowski et al. | 701/301 |
| 6,014,601 | * 1/2000 | Gustafson | 701/45 |
| 6,021,375 | * 2/2000 | Urai et al. | 701/301 |
| 6,054,936 | * 4/2000 | Yamagata et al. | 340/903 |
| 6,060,989 | * 5/2000 | Gehlot | 340/576 |

\* cited by examiner

SYSTEM AND METHOD FOR WARNING OF DANGEROUS DRIVING CONDITIONS

BACKGROUND OF THE INVENTION

The present invention relates to automobile safety systems, and particularly to a computerized vehicle system and method for warning other drivers of dangerous driving conditions.

Automobiles and other vehicles contain an increasing number of safety devices such as airbags, anti-lock brakes, and traction-control systems to deal with dangerous road conditions and protect drivers of vehicles so equipped. These devices prove effective in many cases in preventing accidents or in protecting drivers during an accident. However, there is no substitute for safe and careful driving.

A big part of safe driving is awareness by the driver of problems which may be arising. This awareness must be obtained in time to act accordingly. However, the condition of the road or vehicle ahead of a given driver is often not apparent to the driver until it is too late to take appropriate action. If a dangerous condition exists, an automobile driving ahead is likely to encounter the problem before automobiles behind them. By the time the trailing automobiles become aware of the problem, it is frequently too late to take effective action.

U.S. Pat. No. 5,786,752 issued Jul. 28, 1998 to Bucalo et al. discloses an emergency signal system for vehicles which alerts drivers approaching from the rear of a vehicle of a deceleration of the vehicle which exceeds a predetermined threshold. However, this system is similar to brake light systems and only alerts drivers of absolute speed changes of the vehicle so equipped. The system fails to alert other drivers of dangerous road conditions or of dangerous relative speed changes between the two vehicles.

There is thus a need for a system which warns drivers of dangerous road conditions in time to attempt safety measures.

SUMMARY OF THE INVENTION

The problems described above are solved by, in preferred embodiments, a dangerous driving conditions warning system for a vehicle such as an automobile. The warning system captures signals from two or more devices in an automobile and conveys the signals to a decision circuit which determines whether a dangerous driving condition exists and outputs an activation signal upon detecting a dangerous condition. The activation signal is sent to and activates an indicator such as a warning light or loud audible warning. The warning indicator alerts a trailing vehicle and other vehicles near the vehicle equipped with the warning system of the existence of one of various conditions warranting caution, a reduction in speed, or a veering or turn.

The warning indicator may be a light illuminated when a dangerous condition is detected. The light may be similar in construction to the tail lights of a car and mounted on the rear of the equipped vehicle such as near the third brake light. A second similar light may also be mounted on the front of the vehicle to alert other drivers of the difficulty with the equipped vehicle. The warning indicator may alternatively be an audible signaler such as the horn or an additional sound making device.

In preferred embodiments, the devices from which signals are received include an anti-lock braking system, a speedometer, an odometer, a distance sensor, a traction control system, an airbag deployment system, and a manual trigger. The conditions which can be detected include anti-lock activation, slippery road conditions, tailgating, rapid deceleration, airbag deployment, and excessive approach speed by the trailing automobile.

Some of the problems described above are also solved by a system for warning other drivers of a dangerous driving condition, in which the system includes a distance sensor for measuring distances between the first and second vehicles at a plurality of times, a decision circuit, coupled to receive signals from the distance sensor, for detecting a dangerous driving condition based on the distances measured by the distance sensor, and an indicator coupled to and selectively activated by the decision circuit for indicating the detection of the dangerous driving condition, the indicator being perceivable by the driver of the second vehicle. In particular embodiments, the distance sensor is installed on the rear of the vehicle equipped with the warning system, the decision circuit is capable of detecting excessive approach speed of a trailing vehicle, and the indicator is a warning light installed on the rear of the equipped vehicle.

DETAILED DESCRIPTION OF THE PREFERRED EMBODIMENTS

Figure 1:
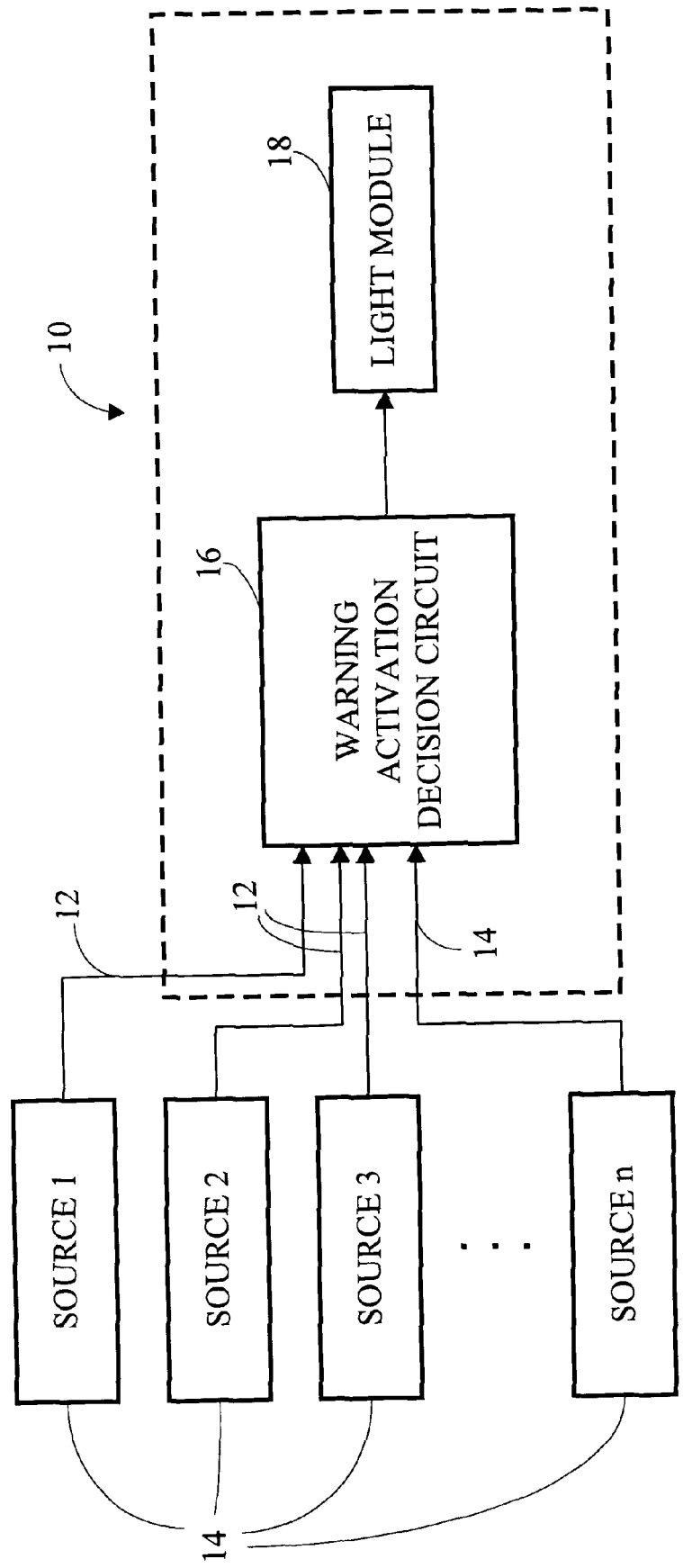
FIG. 1 is a block diagram of a driving warning system in accordance with one preferred embodiment of the present invention.

Preferred embodiments of the system and method of the present invention are now described with reference to FIGS. 1–3. Referring to FIG. 1, a warning system 10 in accordance with the invention includes wires 12 connected to a number of device sources 1, 2, ... n, 14 in an automobile, a warning activation decision circuit 16 connected to and receiving signals carried over wires 12 from the sources 14, and a light module 18 coupled to and activated by the decision circuit 16.

The device sources include any of a variety of measuring devices and safety systems commonly found in or which may be installed on automobiles. The safety devices include airbags, anti-lock brakes, and traction control systems, and the measuring devices include speedometers, odometers, and radar, sonar, or laser based distance measuring devices which measure the distance between the equipped automobile and a stationary or mobile object or vehicle. The operations of and signals produced by all the devices are known to those skilled in the art, and are further described in the following patents, all of which are hereby incorporated by reference into this application as background information:

airbags—U.S. Pat. No. 5,787,377 to Watanabe et al.; U.S. Pat. No. 5,718,451 to White; U.S. Pat. No. 5,459,449 to Ravas, Jr. et al.; and U.S. Pat. No. 5,394,326 to Liu;

anti-lock brakes—U.S. Pat. No. 5,684,702 to Phillips et al.; U.S. Pat. No. 5,522,652 to Negrin et al.; U.S. Pat. No. 5,431,488 to DeVore; U.S. Pat. No. 5,001,641 to Makino; and U.S. Pat. No. 4,840,436 to Burgdorf;

traction-control—U.S. Pat. No. 5,593,217 to Schmitt et al.; U.S. Pat. No. 5,241,478 to Inoue et al.; U.S. Pat.

No. 5,018,595 to Hara et al.; and U.S. Pat. No. 4,924,396 to Fulioka et al.;

speedometers and odometers—U.S. Pat. No. 5,659,290 to Haeri; U.S. Pat. No. 4,916,953 to Lie; U.S. Pat. No. 4,647,901 to Teshima et al.; U.S. Pat. No. 4,012,736 to Angwin;

distance measuring devices—U.S. Pat. No. 5,757,308 to Lissel et al.; U.S. Pat. No. 5,633,705 to Asayama; U.S. Pat. No. 5,510,990 to Hibino et al.; and U.S. Pat. No. 4,948,246 to Shigematsu.

As described in these patents, and as known to those of skill in the art, the nature of the signals vary among these various devices. Some of the devices have only two activation states—on and off—and thus produce a single bit signal. Airbags and anti-lock brakes produce such a single bit signal. Other devices, such as digital speedometers, odometers and distance measuring devices, produce multi-bit signals which are translated by the particular device into the desired information. Among these multi-bit devices, some may produce a signal which is in a special or proprietary format which is not generally compatible with standard digital signal processors, and others may produce signals which are compatible in format with conventional processors. Finally, some devices, such as older model speedometers and odometers, produce analog signals which would need to be converted to digital format for use by a digital signal processor.

The wires 12 which convey the signals from these devices to the decision circuit 16 may be electrical conductors having one end appropriately connected to capture the signal produced by each device. Other alternative signal conveyers may be used, including rf transmitters, optical fiber, etc. The wires or other signal conveyers carry signals from each of the devices 14 to the decision circuit 16 at sufficient strength to be usable by the decision circuit 16, and may require amplification.

The light module 18 is a light which can assume at least two activation states—on and off—and is installed at a location clearly visible to other drivers. For example, the light module 18 may be a yellow "slow" light similar in construction to and mounted near the third brake light at the rear of the automobile. Two light modules may be provided on either side of the brake light, or light modules 18 may be installed above and below the brake light, completely around the brake light, and/or in other locations such as the rear windshield. As an alternative, the light module 18 may be replaced or supplemented by an audible signal loud enough for other drivers to hear.

The warning system 10 is programmed to warn drivers of other automobiles of a number of dangerous road and driving conditions, including slippery road, sudden drastic stops or swerves by the equipped automobile, tailgating by the automobile trailing the equipped automobile, and speeding or excessive approach speed by the trailing automobile. The decision circuit 16 determines whether any of these conditions exists based upon the signals received over the wires 12 and stored logic.

Figure 2:
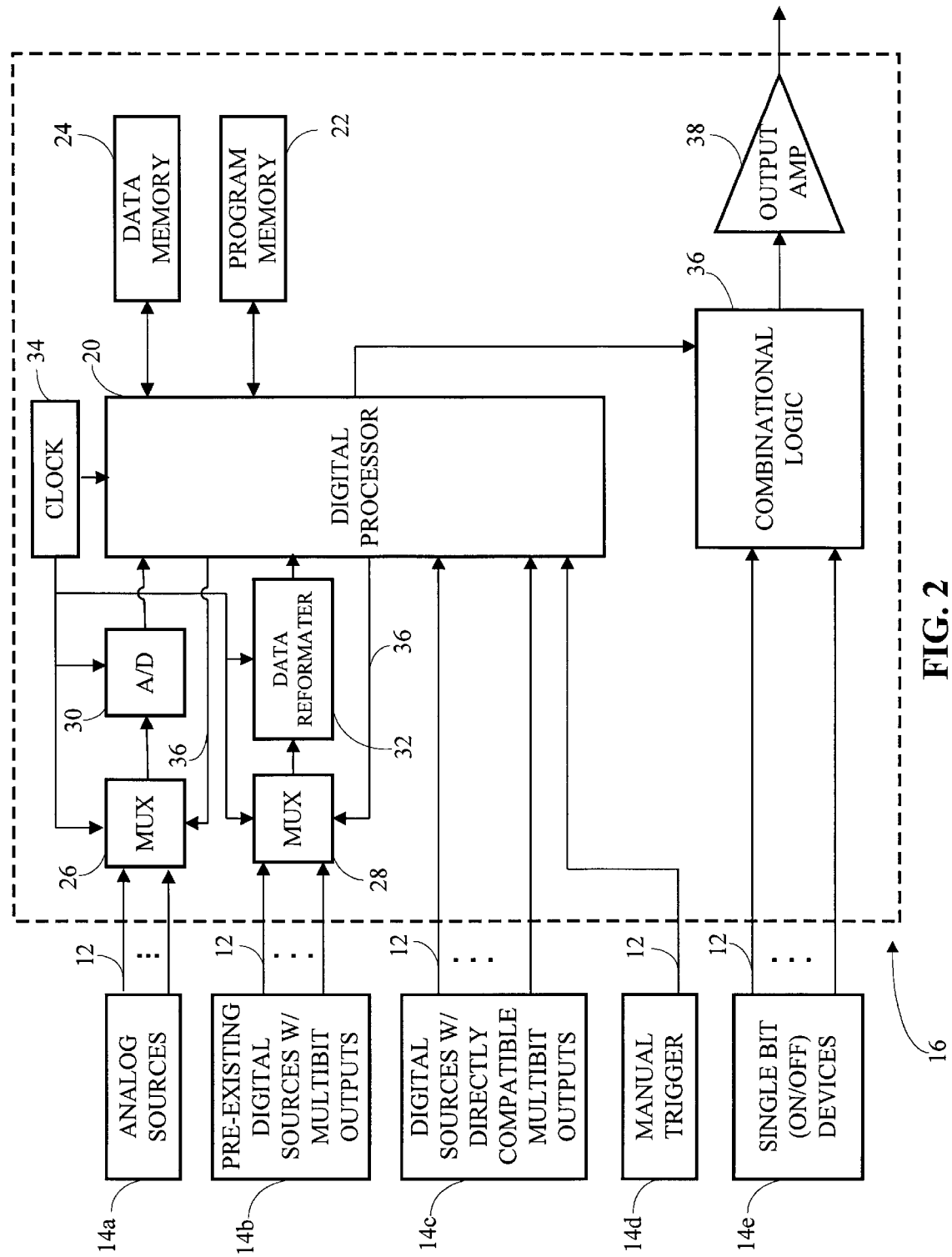
FIG. 2 is a block diagram of a preferred embodiment of the decision circuit shown in FIG. 1 in accordance with the present invention.

A particular embodiment of the decision circuit 16 is shown in FIG. 2. As shown in FIG. 2, warning activation decision circuit 16 contains a digital processor 20 such as a microprocessor, microcontroller, or digital signal processor (DSP) such as the ME model DSP 16000 or other models available from Lucent Technologies, Inc., the assignee of the present application. The digital processor 20 is coupled to a program memory 22 such as ROM storing a program for operating the decision circuit 16 and a data memory 24 such as a RAM for temporarily storing data values for comparison with data values received at other times as explained below.

The decision circuit 16 further contains two multiplexers 26, 28 for each selecting one of a number of signals 12 of the same type for processing at any given time. One multiplexer 26 selects between a number of analog signals received from analog device sources 14a such as analog speedometers and odometers. The selected signal is passed along to an analog-to-digital converter 30 which converts the analog signal to a digital data value suitable for input into the digital processor 20. Another multiplexer 28 selects among a number of pre-existing digital device sources having multi-bit outputs 14b, such as a digital speedometer, and passes the selected signal to a data reformatter 32. The data reformatter 32 reformats the digital signal from the selected pre-existing source 14b from the special format of that device to a standardized format suitable for input to the digital processor 20. As one skilled in the art will recognize, the data reformatter may perform this reformatting in accordance with a predefined algorithm for the given device source or by consulting a translation table contained therein.

The digital processor 20, multiplexers 26, 28, A/D converter 30, and data reformatter 32 are provided timing signals from a clock 34. The multiplexers 26, 28 select among the multiple signal inputs 12 on a polling arrangement timed by the clock 34 or under the control of the digital processor 20 through feedback lines 36 in accordance with any desired control scheme.

The digital processor 20 receives a number of signals directly, including signals from digital sources with directly compatible multi-bit outputs 14c, such as microprocessor-controlled devices, and a single bit signal from a manual trigger 14d which may be activated by the driver of the equipped automobile in case of emergency. The manual trigger may be used by the driver to toggle the state of the warning light 18 manually, either by activating the automobile horn or via a second switch dedicated to this purpose. In this mode, the light 18 cycles rapidly between states at a predetermined rate so that (a) if the light was already on (e.g., if the trailing driver is tailgating and the decision circuit 16 activates the light 18), then the driver can cause it to pulse on and off by engaging the manual trigger 14d; or (b) if the light is off, the driver of the equipped automobile can cause it to pulse to send a message to the trailing driver in a manual fashion, without needing to step on and off the brakes to pulse the brake lights.

The digital processor 20 processes the values in these data sources in accordance with procedures described below. The decision circuit 16 also contains a combinatorial logic element 36 which receives data output from the digital processor 20 as well as signals directly from single bit sources 14e. The combinatorial logic element 36 receives the data from these various sources and decides in accordance with predefined logic whether to activate or deactivate the light 18. The resulting output signal from the combinatorial logic 36 is amplified through an output amp 38 and transmitted to the light 18. (FIG. 1).

As one skilled in the art will appreciate, the decision circuit 16, and particularly the combinatorial logic element 36, may be programmed or hard-wired to implement any number of possible procedures for determining whether a dangerous condition exists depending upon the data received from the source devices 14. Table I below contains one such set of logic.

TABLE 1

| Dangerous Condition | Logic |
|---|---|
| hard press on brakes by driver | If anti-lock brake signal is active |
| slippery road conditions | If traction control system signal is active |
| accident, collision, sudden extremely short stop | If airbag deployment signal is active |
| tailgating | If distance to trailing car d divided by speed of equipped car v is less than two seconds |
| rapid deceleration of equipped car | If speed $v_1$ at first time $t_1$ minus speed $v_2$ at first time $t_2$ divided by time difference $t_2 - t_1$ is greater than a predetermined value (i.e., IF $(v_1 - v_2)/(t_2 - t_1) > k$) |
| excessive approach speed of trailing car | If the absolute value of the distance $d_2$ at time $t_2$ minus the distance $d_1$ at an earlier time $t_1$ divided by time difference $t_2 - t_1$ is greater than predetermined value and if distance $d_2$ at time $t_2$ is less than a second predetermined value (i.e., IF $\mid ((d_2 - d_1)/(t_2 - t_1)) \mid > k_1$ AND $(d_2 < k_2)$) |

Figure 3:
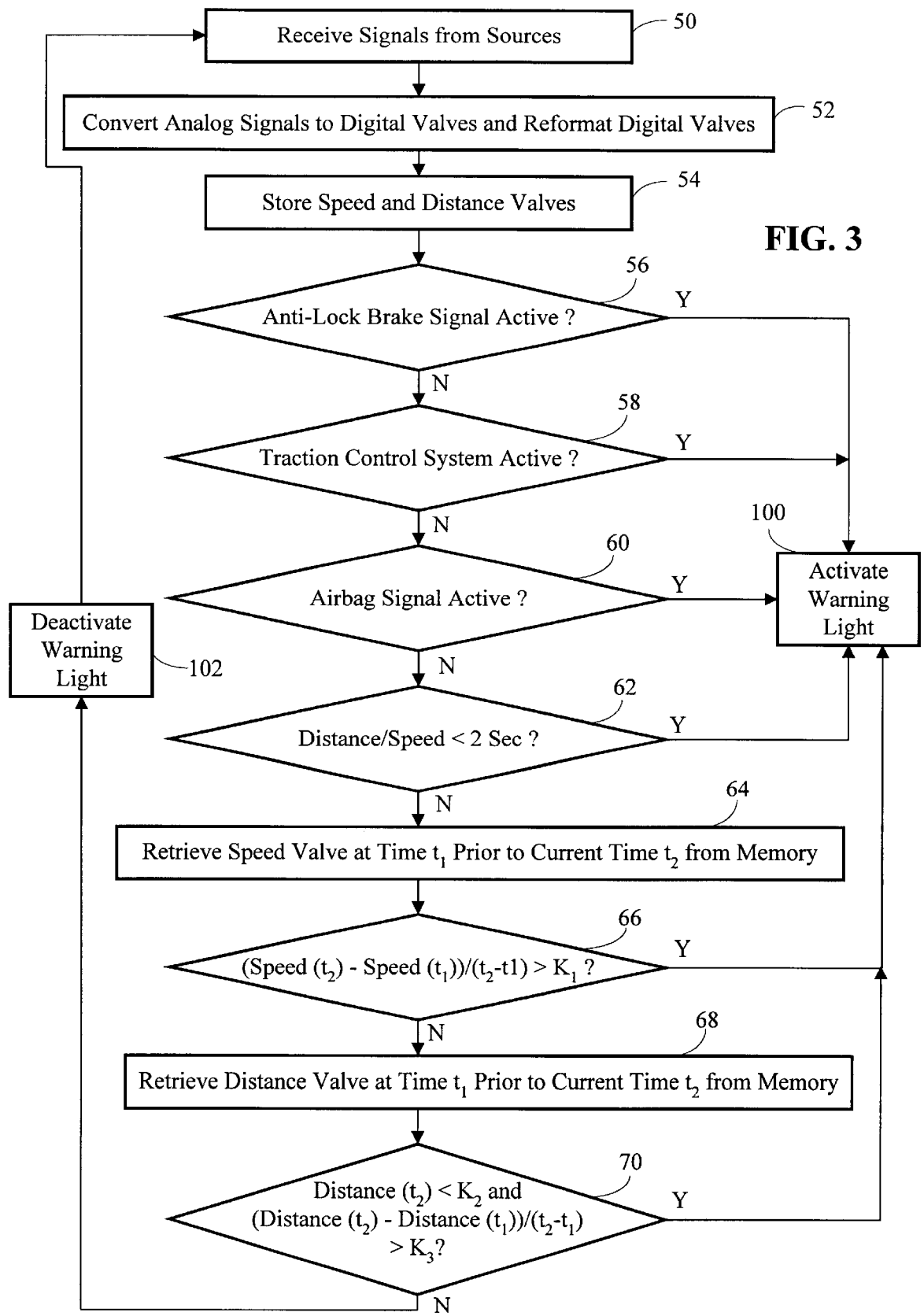
FIG. 3 is a flow chart showing the process of monitoring safety devices and producing a warning in accordance with a preferred embodiment of the present invention.

Furthermore, FIG. 3 contains a flow chart showing one possible implementation of the logic of one particular embodiment of the invention. After receiving signals from the various sources, step 50, converting the analog signals to digital format and reformatting certain digital signals, step 52, the speed and distance values are stored temporarily, step 54. If the anti-lock brake signal is active, step 56, the traction control system signal is active, step 58, or the airbag deployment signal is active, step 60, the warning light is activated, step 100.

If the current distance value divided by the current speed value is under two seconds or some other predetermined value, step 62, this indicates a tailgating situation and the warning light is activated, step 100. To check for rapid deceleration, a prior speed value from a given predefined time interval is retrieved, step 64, and compared to the current speed to determine the rate of change of the speed, step 66. If this speed differential is greater than a predetermined value, the warning light is activated 100. To detect excessive approach speed, a prior distance value from a given predefined time interval is retrieved, step 68, and compared to the current distance to determine the rate of change of the distance, step 70. If this distance differential is greater than a predetermined value and the current distance value is less than another predetermined value, indicating the trailing car is too close and coming up too fast, the warning light is activated, step 100. If none of the conditions exist, the warning light is or remains deactivated, step 102.

If desired, the system 10 may be modified to provide more information to other drivers than the existence of a dangerous condition. For example, the other drivers can be informed of the nature of the detected dangerous condition by assigning a code to each condition and passing the code from the decision circuit 16 to the light module 18. The light module 18 may contain various colored lights each representing a different condition or may contain a sign such as an LED display capable of displaying characters to identify the condition, such as "slippery road", "tailgating", or "approaching too fast". The light module 18 selects the proper condition based upon the code and a stored table or data file of conditions and associated codes. Alternatively, the decision circuit 16 or light module 18 may contain a translation module for translating the detected condition to a predefined recommended action which is displayed to other drivers, such as "slow down", "brake hard", or "swerve".

As a further alternative, the light module 18 may be capable of producing light at various intensity to indicate the severity of the dangerous condition. The decision circuit 16 may contain a number of stored parameters for comparison to the data values received from the various devices, each stored value representing another level of severity. For example, for detecting tailgating, the decision circuit 16 may compare the distance and speed values against several parameters, e.g., two seconds, one second, and one-half second, or may track a continuous time value for the tailgating, and sends severity data to the light module 18. The light module then increases the intensity of the light emission as the severity of the tailgating increases.

While the invention has been described and illustrated in connection with preferred embodiments, many variations and modifications as will be evident to those skilled in this art may be made without departing from the spirit and scope of the invention. The invention is thus not to be limited to the precise details of methodology or construction set forth above as such variations and modification are intended to be included within the scope of the invention.

What is claimed is:

1. A system in a first vehicle for warning a driver of a second vehicle of a dangerous driving condition, the system comprising:
   a first signal conveyer coupled to a distance sensor for measuring a distance between the first vehicle and the second vehicle at a given time;
   a decision circuit, coupled to receive signals carried by the first signal conveyer, for detecting excessive approach speed by the second vehicle to the first vehicle; and
   an indicator coupled to and selectively activated by the decision circuit for indicating the detection of the excessive approach speed, the indicator being perceivable by the driver of the second vehicle.

2. The system of claim 1, comprising a plurality of signal conveyers each coupled to one of a plurality of devices on the first vehicle, wherein the decision circuit is coupled to receive signals carried by the signal conveyers and detect a dangerous driving condition based on the received signals, and wherein the indicator is selectively activated by the decision circuit for indicating the detection of the dangerous driving condition.

3. The system as defined in claim 2, wherein the signal conveyers are coupled to two or more devices in the group consisting of an anti-lock braking system, a speedometer, an odometer, a distance sensor, a traction control system, an airbag deployment system, and a manual trigger.

4. The system of claim 3, wherein the decision circuit is capable of detecting one or more dangerous driving conditions in the group consisting of anti-lock brake activation, slippery road conditions, tailgating, rapid deceleration, airbag deployment, and excessive approach speed by the second automobile.

5. The system of claim 2, wherein at least one of the first vehicle devices produces an analog signal, the system comprising an analog to digital converter coupled between the signal conveyer for the at least one analog device and the decision circuit.

6. The system as defined in claim 2, wherein the decision circuit comprises a processor and one or more multiplexers for selecting among the two or more signals conveyed by the signal conveyers.

7. The system as defined in claim 2, wherein the indicator has a plurality of activated states.

8. The system as defined in claim 7, wherein the decision circuit determines a severity of a detected dangerous condition and sending a signal to the indicator identifying the severity of the detected condition, and wherein the indicator assumes one of the activated states depending upon the severity of the condition.

9. The system as defined in claim 7, wherein the decision circuit detects a plurality of dangerous conditions and sending a signal to the indicator identifying which one of the plurality of conditions is detected, and wherein the indicator assumes one of the activated states depending upon a condition identified by the decision circuit.

10. The system as defined in claim 9, wherein the plurality of states include states for displaying a plurality of textual messages identifying the detected dangerous condition or a recommended course of action depending upon the detected dangerous condition.

11. The system as defined in claim 7, wherein the indicator is a visible indicator positioned to be visible to the driver of the second vehicle.

12. The system as defined in claim 1, wherein the indicator is an audio indicator producing a sound loud enough to be audible to the driver of the second vehicle.

13. The system as defined in claim 1, wherein the decision circuit comprises:
    a memory for storing at least a first distance value $d_1$ and a second distance value $d_2$ received in signals from the distance sensor at a first time $t_1$ and a second time $t_2$, respectively; and
    logic for detecting excessive approach speed when $|d_2-d_1|/(t_2-t_1)|/(t_2-t_1)$ exceeds a first value and $d_2$ is less than a second value.

14. The system as defined in claim 1, wherein a second signal conveyer is coupled to a speedometer.

15. The system as defined in claim 14, wherein the decision circuit detects tailgating by the second vehicle with respect to the first vehicle.

16. The system as defined in claim 15, wherein the decision circuit comprises logic for detecting tailgating when a distance value received in the signal from the distance sensor at a first time divided by a speed value received in the signal from the speedometer at the first time is less than a time value.

17. The system as defined in claim 16, wherein the time value is two seconds.

18. The system as defined in claim 14, wherein the decision circuit detects rapid deceleration by the first vehicle.

19. The system as defined in claim 18, wherein the decision circuit comprises
    a memory for storing at least a first speed value $v_1$ and a second speed value $v_2$ received in signals from the speedometer at a first time $t_1$ and a second time $t_2$, respectively; and
    logic for detecting rapid deceleration when $(v_2-v_1)/(t_2-t_1)$ exceeds a given deceleration value.

20. A method for issuing a warning about a dangerous driving condition, the method comprising:
    receiving a plurality of signals from a speedometer and distance sensor which measures a distance between first and second vehicles,
    determining whether a dangerous driving condition exists comprising determining whether the first vehicle is rapidly decelerating, whether the second vehicle is tailgating with respect to the first vehicle, and whether the second vehicle is approaching the first vehicle at an excessive speed;
    sending an activation signal to an indicator when a dangerous condition is determined to exist; and
    activating the indicator upon receipt by the indicator of the activation signal to thereby indicate the existence of a dangerous driving condition to a driver of a second vehicle.

21. The method as defined in claim 20, comprising receiving a plurality of signals from a plurality of safety devices in the group consisting of an airbag deployment device, anti-lock brakes, and a traction control system, and wherein the step of determining whether a dangerous condition exists comprises determining that a dangerous condition exists upon activation of one or more of the safety devices.

22. A system in a first vehicle for warning a driver of a second vehicle of a dangerous driving condition, the system comprising:
    a distance sensor for measuring distances between the first and second vehicles at a plurality of times;
    a decision circuit, coupled to receive signals from the distance sensor, for detecting a dangerous driving condition based on the distances measured by the distance sensor, the decision circuit comprising:
    a memory for storing at least a first distance value $d_1$ and a second distance value $d_2$ received in signals from the distance sensor at a first time $t_1$ and a second time $t_2$, respectively; and
    logic for detecting an excessive approach speed by the second vehicle with respect to the first vehicle when the absolute value of $(d_2-d_1)/(t_2-t_1)$ exceeds a first value and $d_2$ is less than a second value; and
    an indicator coupled to and selectively activated by the decision circuit for indicating the detection of the dangerous driving condition, the indicator being perceivable by the driver of the second vehicle.

23. An automobile comprising:
    two or more devices in the group consisting of an anti-lock braking system, a traction control system, an airbag deployment system, and a manual trigger;
    a plurality of signal conveyers each coupled to one of the plurality of devices on the automobile;
    a decision circuit, coupled to receive signals carried by the signal conveyers, for detecting a dangerous driving condition based on the received signals; and
    an indicator coupled to and selectively activated by the decision circuit for indicating the detection of the dangerous driving condition, the indicator being perceivable by the driver of a second automobile.

24. A system in a first vehicle for warning a driver of a second vehicle of a dangerous driving condition, the system comprising:
    a plurality of signal conveyers each coupled to one of a plurality of devices on the first vehicle;
    a decision circuit, coupled to receive signals carried by the signal conveyers, for interpreting the signals received from the signal conveyers and detecting a dangerous driving condition based on the interpreted signals;
    a clocking mechanism, coupled to the decision circuit, for controlling the decision circuit to select which signals from the signal conveyers the decision circuit interprets at any given time; and
    an indicator coupled to and selectively activated by the decision circuit for indicating the detection of the dangerous driving condition, the indicator being perceivable by the driver of the second vehicle.

25. A system in a first vehicle for warning a driver of a second vehicle of a dangerous driving condition, the system comprising:
    a plurality of signal conveyers each coupled to one of a plurality of devices on the first vehicle, wherein a first signal conveyer is coupled to a distance sensor for measuring a distance between the first vehicle and the second vehicle at a given time and a second signal conveyer is coupled to a speedometer;

a decision circuit, coupled to receive signals carried by the signal conveyers, for detecting a dangerous driving condition based on the received signals including tailgating by the second vehicle with respect to the first vehicle when a distance value received in the signal from the distance sensor at a first time divided by a speed value received in the signal from the speedometer at the first time is less than a time value; and an indicator coupled to and selectively activated by the decision circuit for indicating the detection of the dangerous driving condition, the indicator being perceivable by the driver of the second vehicle.

26. The system as defined in claim 25, wherein the time value is two seconds.

27. A system in a first vehicle for warning a driver of a second vehicle of a dangerous driving condition, the system comprising:

two or more signal conveyers each coupled to one of a plurality of devices on the first vehicle;

a decision circuit, coupled to receive signals carried by the signal conveyers, for detecting a dangerous driving condition based on the received signals, the decision circuit comprising a processor and one or more multiplexers for selecting among the two or more signals conveyed by the signal conveyers; and an indicator coupled to and selectively activated by the decision circuit for indicating the detection of the dangerous driving condition, the indicator being perceivable by the driver of the second vehicle.

28. The system of claim 27, comprising a clock for controlling the one or more multiplexers to thereby select from among the two or more signals conveyed by the signal conveyers.

29. A system in a first vehicle for warning a driver of a second vehicle of a dangerous driving condition, the system comprising:

a plurality of signal conveyers each coupled to one of a plurality of devices on the first vehicle;

a decision circuit, coupled to receive signals carried by the signal conveyers, for detecting a dangerous driving condition based on the received signals; and an indicator coupled to and selectively activated by the decision circuit for indicating the detection of the dangerous driving condition, the indicator being perceivable by the driver of the second vehicle, and indicator having a plurality of activated states.

30. The system of claim 29, wherein the decision circuit detects a plurality of dangerous conditions and sending a signal to the indicator identifying which one of the plurality of conditions is detected, and wherein the indicator assumes one of the activated states depending upon a condition identified by the decision circuit.

31. The system of claim 30, wherein the plurality of states include states for displaying a plurality of textual messages identifying the detected dangerous condition or a recommended course of action depending upon the detected dangerous condition.

32. The system of claim 29, wherein the decision circuit is capable of determining a severity of a detected dangerous condition and sending a signal to the indicator identifying the severity of the detected condition, and wherein the indicator assumes one of the activated states depending upon the severity of the condition.

33. A system in a first vehicle for warning a driver of a second vehicle of a dangerous driving condition, the system comprising:

a plurality of signal conveyers each coupled to one of a plurality of devices on the first vehicle, a first signal conveyer being coupled to a speedometer;

a decision circuit, coupled to receive signals carried by the signal conveyers, for detecting a dangerous driving condition based on the received signals including rapid deceleration by the first vehicle; and an indicator coupled to and selectively activated by the decision circuit for indicating the detection of the dangerous driving condition, the indicator being perceivable by the driver of the second vehicle.

34. The system of claim 33, wherein the decision circuit comprises a memory for storing at least a first speed value $v_1$ and a second speed value $v_2$ received in signals from the speedometer at a first time $t_1$ and a second time $t_2$, respectively; and logic for detecting rapid deceleration when $(v_2-v_1)/(t_2-t_1)$ exceeds a given deceleration value.

35. The system of claim 33, wherein the decision circuit detects tailgating by the second vehicle with respect to the first vehicle.

36. The system of claim 35, wherein the decision circuit comprises logic for detecting tailgating when a distance value received in the signal from the distance sensor at a first time divided by a speed value received in the signal from the speedometer at the first time is less than a time value.

37. The system of claim 33, wherein the indicator is a visible indicator positioned to be visible to the driver of the second vehicle.

38. The system of claim 33, wherein the indicator is an audio indicator producing a sound loud enough to be audible to the driver of the second vehicle.

39. The system of claim 33, wherein at least one of the first vehicle devices produces an analog signal, the system comprising an analog to digital converter coupled between the signal conveyer for the at least one analog device and the decision circuit.

40. The system of claim 33, wherein the decision circuit comprises a processor and one or more multiplexers for selecting among the two or more signals conveyed by the signal conveyers.

41. The system of claim 33, wherein the indicator has a plurality of activated states.

42. The system of claim 41, wherein the decision circuit detects a plurality of dangerous conditions and sending a signal to the indicator identifying which one of the plurality of conditions is detected, and wherein the indicator assumes one of the activated states depending upon a condition identified by the decision circuit.

43. The system of claim 42, wherein the plurality of states include states for displaying a plurality of textual messages identifying the detected dangerous condition or a recommended course of action depending upon the detected dangerous condition.

44. The system claim 41, wherein the decision circuit determines a severity of a detected dangerous condition and sending a signal to the indicator identifying the severity of the detected condition, and wherein the indicator assumes one of the activated states depending upon the severity of the condition.

* * * * *